United States Patent [19]
Schleif

[11] 3,815,274
[45] June 11, 1974

[54] FISH HOOK APPARATUS WITH COVERING BODY PORTION

[76] Inventor: George H. Schleif, 4030 Chamoune, San Diego, Calif. 92105

[22] Filed: July 17, 1972

[21] Appl. No.: 272,488

[52] U.S. Cl................ 48/42.1, 43/43.4, 43/57.5 R
[51] Int. Cl.......................................... A01k 85/00
[58] Field of Search............... 43/42.1, 43.4, 57.5 R

[56] References Cited
UNITED STATES PATENTS
2,332,400  10/1943  Richardson ........................ 43/42.1
2,522,292  9/1950  Modesto .............................. 43/43.4
2,685,756  10/1954  Mowbray ......................... 43/57.5 R
2,981,027  4/1961  Dewyer .............................. 43/42.1

Primary Examiner—Antonio F. Guida
Assistant Examiner—Daniel J. Leach
Attorney, Agent, or Firm—Brown & Martin

[57] ABSTRACT

An integral and substantially rigid fish hook that may have multiple hook portions, with an enclosing body that covers the hook portions, which body is movable to allow the hook portion to project through the body, upon said body being moved by a fish biting the body or contacting it forcefully.

2 Claims, 6 Drawing Figures

PATENTED JUN 11 1974 3,815,274

FISH HOOK APPARATUS WITH COVERING BODY PORTION

BACKGROUND OF THE INVENTION

In fishing, such as by trolling, casting or the like, plugs and other fishing lures are oftentimes moved through the water, which plugs or fishing lures have multiple hooks connected thereto. These attached fish hooks may comprise a fish hook with a single hook portion or with multiple hook portions, such as three hook portions spaced substantially equal distances apart. When such lures and suspended hook portions are pulled through the water, the hooks tend to hook onto weeds, logs, rocks and the like. Once the hooks make such contact and hook into the particular obstruction, then the fishing lures cannot be retrieved.

Thus it is advantageous to have a fish hook apparatus with a body that fits over the fish hook and the hook portion so that in normal movement through the water, and through weeds and around obstructions such as rocks and logs, the body portion shelters the hook portion from hooking into such obstructions. Yet the body portion has sufficient resilience or resilient force so that the body portion will move upon being bitten, grasped or forcefully contacted by fish, so that the pointed end of the hook moves through the body and hooks the fish.

SUMMARY OF THE INVENTION

In an exemplary embodiment of this invention, an integral and substantially rigid fish hook has a body mounted thereon that covers the hook portion of the fish hook. The body may take any of several configurations. In one configuration, the body portion is made of a plastic material that has a substantially rigid structure. The plastic body or housing slides on the shank portion of the fish hook and has outer openings through which the hook portion of the fish hook moves and projects. The fish hook used in this embodiment normally has more than one hook portion, and the hook portions project in different radial directions. The body portion has an internal bore in which a spring is positioned with the spring being mounted on the shaft of the fish hook with one end stopped in its resilient movement by the divergence of the hook portions of the fish hook. The spring biases the body portion, in slidable movement on the fish hook shank in a forward direction, wherein the hook portions of the fish hook are covered. When a fish bites the body portion, it causes a holding force to be exerted thereon that moves the body portion against the spring and projects the hook portions of the fish hook through the openings whereby the hook portions are able to contact the fish.

In another embodiment, the body is made of a resilient and substantially flexible material, such as foam rubber or the like and has a flexible and water impervious skin with a smooth surface. The cover or skin being smooth and impervious to water does not leave air bubbles on its surface in movement through the water. Further the skin has sufficient strength so as to prevent crushing of the foam material in normal movement through the water, weeds, and over rocks or the like. However in this embodiment, the body still has a spring biasing device for biasing the body to the forward direction on the shank of the fish hook, and further has outer openings allowing the points of the fish hook to pass therethrough.

In another embodiment, the same or similar foam body construction with the outer skin or cover is secured to the shank of the fish hook without the slidable movement or spring connection therein. The pointed ends of the hook portions of the fish hook project in an opening in the foam material with the ends projecting into the foam material. Since the foam material and its cover are easily punctured by the pointed ends of the fish hook, when the fish bites the body the fish hook then projects through the material and out in a manner that will cause the fish hook to hook the fish.

It is therefore an object of this invention to provide a new and improved fish hook apparatus having a body that is positioned on the rigid fish hook and prevents the fish hook from hooking weeds, logs and the like in movement through the water and yet resiliently moves or deforms upon being bitten by a fish to expose hook portions of the fish hook to hook the fish.

Other objects and many advantages of this invention will become more apparent upon a reading of the following detailed description and an examination of the drawings, wherein like reference numerals designate like parts throughout and in which.

Figure 1:
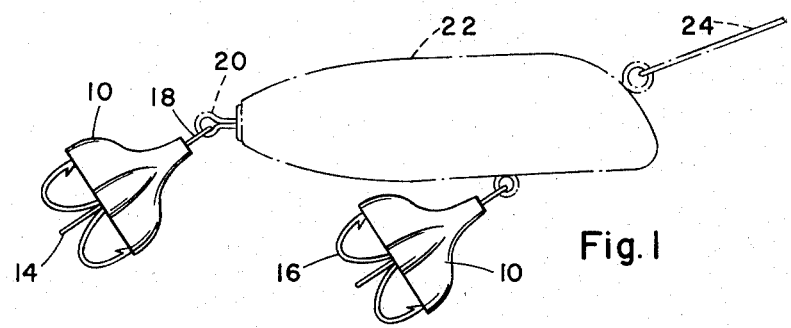
FIG. 1 is a side elevation view of an embodiment of the fish hook apparatus of this invention attached to a lure.

Referring now to the drawings, the fish hook apparatus in an illustrative embodiment comprises a body portion 10 mounted on an integral and substantially rigid fish hook structure 14 and 16. The fish hook structure has multiple hook portions, as are well known. The end of the shank portion of the fish hooks has an eye portion 18 that, for example, allows the fish hook apparatus to be secured to normal mounting eyes 20 on fishing lures, such as plug 22, that is pulled through the water by a line 24.

Figure 2:
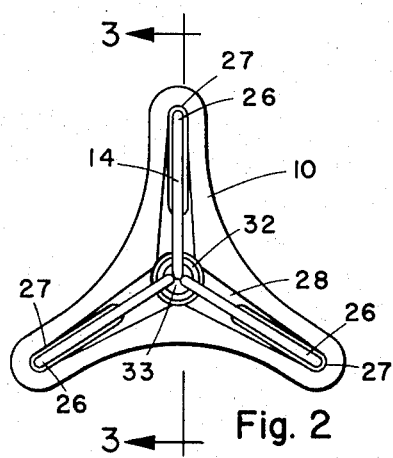
FIG. 2 is an enlarged end elevation view of an illustration of an embodiment of the basic fish hook apparatus, taken from the hook end.
Figure 3:
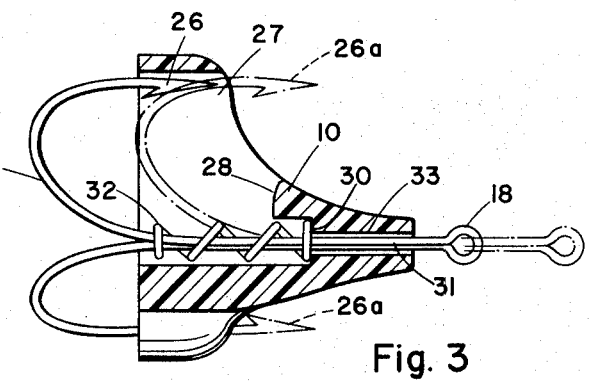
FIG. 3 is a sectional view taken on line 3—3 of FIG. 2.
Figure 4:
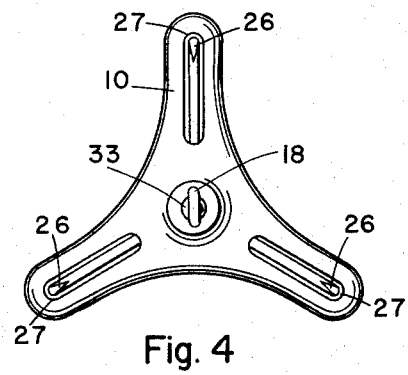
FIG. 4 is an end view taken from the attachment end.

In one embodiment, referring to FIGS. 2 and 3, the body 10 comprises a rigid plastic material. The rigid body 10 has a central opening 33 that is slidably mounted on the shank 31 of the fish hook structure 14. A spring 32, also mounted on the shank 31, abuts end 30 of a cylindrical opening to resiliently bias the body portion 10 to the outer projected position. The body 10 has a plurality of openings 27 at its outer edge through which the pointed projections 26 of the hook portions of the fish hook project. The inner surface of the body 10 is curved as at 28, to allow maximum movement of the hook portions 26 through the opening 27.

In normal movement through the water, the spring 32 has sufficient force to hold the body portion 10 in the forward position. When a fish bites the body 10, then the fish holds the body 10 against movement causing it to compress spring 32. This causes the hook portion 26 to move in the direction of the dotted line position 26a to a point where the hook portion projects out sufficiently to hook the fish.

Figure 5:
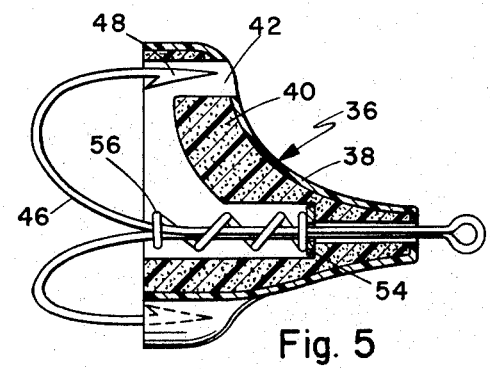
FIG. 5 is a sectional view similar to FIG. 3, illustrating an alternate body construction.

In a modified embodiment of FIG. 5, the structure and operation are substantially the same as that described relative to FIG. 3, with the exception that the body portion 36 is made of a resilient material such as foam rubber or the like. The foam rubber material 40, has a water impervious cover surface 38 that is smooth and does not leave air bubbles on the surface in movement through the water, and also has sufficient strength so as not to crush in normal movement through the water and over weeds, logs, rocks and the like. The body 36 has openings 42 through which the hook portions 48 of hook 46 move.

In operation, when a fish bites the body 36, the body not only deforms under the force of the grasp of the fish, but also spring 56 compresses in the manner previously described allowing the body 36 to move and allow washer 54 to compress the spring 56 in the manner previously described wherein hook portion 48 projects through opening 42 to hook the fish.

Figure 6:
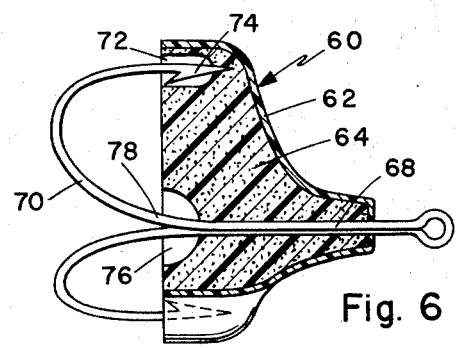
FIG. 6 is a similar sectional view illustrating a further modified body construction.

In still another embodiment, referring to FIG. 6, the body portion 60 comprises foam material 64 having the water impervious cover 62 as described relative to FIG. 5. In this embodiment, the foam material 64 is secured on the shank portion 68 of the hook 70, and is capable of only slight slidable movement thereon. The hook portion 74 projects in opening 72 for orientation, with the end projecting slightly in the foam material 64. Opening 76 allows for some reasonable movement of the foam material 64 by providing an opening for the divergence of the hook structure at 78.

In operation, the fish again bites the body portion 60, causing the body portion to deform exposing the hook portion 74 that hooks the fish.

Having described my invention, I now claim:

1. A hook apparatus for being pulled through the water comprising:
    an integral and substantially rigid fish hook having an eye and a hook portion with multiple hooks mounted on a joint shank and projecting at lateral spaced angles,
    a body mounted on the fish hook and covering the pointed ends of said multiple hooks,
    said body comprising a unitary lure shaped housing, the lower end of which extends outwardly from said shank to enclose the pointed ends of said multiple hooks and the space between said multiple hooks around said shank, and extends in substantially a conical shape to a narrow end adjacent the eye end of the shank,
    said body including resilient movable means enclosed by said body for resiliently biasing said body to hold a given position on said shank relative to said fish hook, exposing said hook portion from said body upon said body being bit or contracted forcefully by a fish,
    said body comprising a resilient material mounted on the shank of the fish hook, and having an outer closing portion that extends from the shank of the fish hook to the hook portion thereof, covering the hook portion,
    said body having a relatively soft and porous structure with an outer water impervious cover that doesn't leave air bubbles on the surface thereof in movement through the water,
    and which resilient porous material and cover may be easily pierced by the hook portions of said fish hook;
    and said resilient movable means having that resilient force required to prevent movement of said body in normal movement through the water.

2. A hook apparatus for being pulled through the water comprising:
    an integral and substantially rigid fish hook having an eye and a hook portion with multiple hooks mounted on a joint shank and projecting at lateral spaced angles,
    a body mounted on the fish hook and covering the pointed ends of said multiple hooks,
    said body comprising a unitary lure shaped housing, the lower end of which extends outwardly from said shank to enclose the pointed ends of said multiple hooks and the space between said multiple hooks around said shank, and extends in substantially a conical shape to a narrow end adjacent the eye end of the shank,
    said body including resilient movable means enclosed by said body for resiliently biasing said body to hold a given position on said shank relative to said fish hook, exposing said hook portion from said body upon said body being bit or contracted forcefully by a fish,
    said body comprises a resilient foam material having an outer skin cover that is water impervious and has a surface sufficiently smooth that it does not leave bubbles on its surface in movement through the water,
    and which skin has sufficient strength to not crush during normal movement through the water,
    and said resilient movable means having that resilient force required to prevent movement of said body in normal movement through the water.

* * * * *